US011237378B2

(12) United States Patent
Gustafsson

(10) Patent No.: US 11,237,378 B2
(45) Date of Patent: Feb. 1, 2022

(54) DEVICE FOR A WEAPON STATION

(71) Applicant: BAE SYSTEMS BOFORS AB, Karlskoga (SE)

(72) Inventor: Nils Gustafsson, Kristinehamn (SE)

(73) Assignee: BAE SYSTEMS BOFORS AB, Karlskoga (SE)

( * ) Notice: Subject to any disclaimer, the term of this patent is extended or adjusted under 35 U.S.C. 154(b) by 451 days.

(21) Appl. No.: 16/328,362

(22) PCT Filed: Aug. 24, 2017

(86) PCT No.: PCT/SE2017/050857
§ 371 (c)(1),
(2) Date: Feb. 26, 2019

(87) PCT Pub. No.: WO2018/044220
PCT Pub. Date: Mar. 8, 2018

(65) Prior Publication Data
US 2021/0294087 A1 Sep. 23, 2021

(30) Foreign Application Priority Data

Aug. 29, 2016 (SE) .................... 1630205-1

(51) Int. Cl.
*F41G 3/02* (2006.01)
*G02B 23/08* (2006.01)
*F41G 3/16* (2006.01)
*G02B 7/182* (2021.01)
*F41G 3/06* (2006.01)
*F41G 3/22* (2006.01)
(52) U.S. Cl.
CPC .............. *G02B 23/08* (2013.01); *F41G 3/02* (2013.01); *F41G 3/16* (2013.01); *G02B 7/182* (2013.01); *F41G 3/065* (2013.01); *F41G 3/22* (2013.01)

(58) Field of Classification Search
CPC ... F41G 3/22; F41G 3/065; F41G 3/16; F41G 3/02; G02B 7/182; G02B 23/08
USPC .............................. 42/118, 140, 111; 89/1.11
See application file for complete search history.

(56) References Cited

U.S. PATENT DOCUMENTS 5,339,792 A 8/1994 Mccain
5,793,528 A * 8/1998 Wallace ................. G02B 23/14
248/481

(Continued)

FOREIGN PATENT DOCUMENTS

WO 03054471 A1 7/2003
WO 2011022541 A2 2/2011

(Continued)

OTHER PUBLICATIONS

International Search Report (dated Nov. 20, 2017) for corresponding International App. PCT/SE2017/050857.

*Primary Examiner* — John Cooper
(74) *Attorney, Agent, or Firm* — WRB-IP LLP

(57) ABSTRACT

An optical module for an independent line of sight is capable of being arranged on a sight unit. The optical module contains at least a first mirror and at least a movably arranged second mirror. A method for converting an existing weapon station into a weapon station with an independent line of sight, a sight unit arranged with an optical module, and a weapon station embodied with a sight unit, wherein an optical module is arranged on the sight unit, are also provided.

9 Claims, 5 Drawing Sheets

(56) References Cited

U.S. PATENT DOCUMENTS

| | | | | |
|---|---|---|---|---|
| 6,311,424 B1* | 11/2001 | Burke | ............ | F41G 1/40 |
| | | | | 42/111 |
| 6,643,969 B1* | 11/2003 | Avizonis, Jr. | ............ | F41G 1/46 |
| | | | | 42/118 |
| 7,640,691 B2* | 1/2010 | Karcher | ............ | F41G 11/003 |
| | | | | 42/118 |
| 10,989,498 B2* | 4/2021 | Baker | ............ | F41G 3/323 |
| 2005/0241210 A1* | 11/2005 | Karcher | ............ | F41G 11/003 |
| | | | | 42/119 |
| 2005/0252063 A1* | 11/2005 | Flannigan | ............ | G02B 23/04 |
| | | | | 42/119 |
| 2006/0005448 A1 | 1/2006 | Ballard | | |
| 2020/0011641 A1* | 1/2020 | Baker | ............ | G02B 23/14 |

FOREIGN PATENT DOCUMENTS

| | | |
|---|---|---|
| WO | 2012015777 A1 | 2/2012 |
| WO | 2013176844 A1 | 11/2013 |

\* cited by examiner

DEVICE FOR A WEAPON STATION

BACKGROUND AND SUMMARY

The present invention relates to an optical module for an independent line of sight, wherein the optical module is capable of being arranged on a sight unit. The invention further relates to a method for converting an existing weapon station into a weapon station with an independent line of sight. The invention further relates to a sight unit arranged with an optical module. The invention further relates to a weapon station embodied with a sight unit, wherein an optical module is arranged on the sight unit.

Weapon stations are currently in widespread use in all branches of the military and have become rapidly established. The expression weapon station, also referred to as RWS or Remote Weapon Station, denotes a remotely controllable device comprising some form of sensor system, such as a sight, and some form of weapon that are movably arranged on a controllable unit. The purpose of the weapon station is to ensure that a marksman or a soldier can be present in a protected environment, such as an armoured vehicle, but at the same time can operate a weapon, arranged on the weapon station, by remote control.

The development of weapon stations has passed through a number of developmental stages or variants of weapon stations. For example, the sensor unit can be arranged in relation to the weapon unit and moved jointly both in terms of its height, elevation or rotation in the horizontal plane, and in the lateral direction in relation in the horizontal plane. The sensor unit and the weapon unit can also be arranged so as to be moved jointly in the lateral direction and to be independently movable in elevation, or the sensor unit and the weapon unit can be arranged so as to be moved jointly in elevation and to be independently movable in the lateral direction. The sight unit and the weapon unit can also be movable entirely independently of one another in both the lateral direction and in elevation. In the case that the sight unit and the weapon unit are arranged in a fixed relationship to one another, or in other cases where the sight unit and the weapon unit are moved jointly, a dependent line of sight, or line of sighting, is said to occur, that is to say that the line of sight of the sight coincides with the line of sight of the weapon. The expression line of sight is used here to denote the line with which the sight is aimed or the line with which the weapon is arranged or aimed, also referred to as the weapon line. The line of sight can also be referred to as the centre line or the line of aim.

Patent document WO 2012/015777 A1 describes a weapon station comprising a weapon mounting unit and a sight mounting unit, wherein the weapon mounting unit is rotatably arranged in relation to a first rotatable drive mechanism and wherein the sight mounting unit is arranged in relation to a second rotatable drive mechanism. The weapon mourning unit is also arranged in relation to an elevation shaft, and the sight unit is so arranged as to be capable of being elevated by rotation of the sight unit. The disclosed weapon station has a sight mounting unit that is movable independently of the weapon mounting unit. Patent document WO 2012/015777 A1 discloses a complex and expensive technical solution for achieving an independent line of sight.

Patent document WO 03/054471 A1 describes a weapon station, wherein the installed weapon and the sensor module are arranged jointly on a rotatable base module, and wherein the installed weapon and the sensor module are respectively capable of individual elevation. The installed weapon is arranged above the sensor module. For the embodiment described above, the line of sight and the weapon line are identical in the lateral direction but different in the elevation direction. In an alternative embodiment described in patent document WO 03/054471 A1, the sensor module and the installed weapon are arranged with the same motor for elevation, and the sensor module and the installed weapon are thus elevated to the same elevation, or angle, at the same time. For this embodiment, the line of sight and weapon line are identical. Patent document WO 03/054471 A1 discloses a weapon station having an only partially independent line of sight.

When requirements in respect of stability are higher for the sight unit than for the weapon unit, an independent line of sight is important in order to be able to distinguish between the servo system for the sight unit and the weapon unit, so that a servo system with higher stability is utilized for the sight unit than for the weapon unit. An independent line of sight is also of relevance in modern weapon systems in order to be able to track targets effectively, engage moving targets and operate with indirect fire.

The invention proposes to address the above problems through the development of a method and a device for mounting on an existing weapon station for the easy establishment of an independent line of sight.

One purpose of the present invention is to provide the technical field with a module for an independent line of sight which is capable of being arranged in relation to or on an existing weapon station or sight. It is accordingly possible, with an optical module, to upgrade an existing solution, such as a weapon station, from a system with a dependent line of sight to a system with an independent line of sight. By stabilizing a mirror arranged in an optical module instead of an entire sensor housing, the requirements in respect of the size of the servo which controls the mirror and the power requirements in respect of the control electronics, and thereby also the cost and the power consumption, are reduced. The guiding angles are halved, including for a solution in which mirrors are used instead of an entire sensor housing being moved, which reduces the power consumption and the requirements for speed in the servo for displaying angles.

The second purpose of the invention is described in more detail in conjunction with the detailed description of the invention.

The invention relates to an optical module for an independent line of sight, wherein the optical module is capable of being arranged on a single unit and wherein the optical module contains at least a first mirror and at least a movably arranged second mirror.

According to further aspects of the improved optical module for an independent line of sight, it is required;

that the movably arranged second mirror is controlled from an externally arranged control unit.

that the sight unit contains electro-optical sensors.

that the electro-optical sensors are at least one of the following: a video sensor adapted for the visible optical wavelength range, an IR-sensor or a laser rangefinder.

that it is possible to select, by movement of the first mirror;

i) that the optical module gives an independent line of sight, when the optical path passes via a second entry point arranged on the optical module, via at least the movably arranged second mirror and the first mirror, in relation to an exit point arranged on the optical module, ii) that the optical module does not influence the optical path through the optical module, when the optical path passes freely through the optical module through a first entry point arranged on the optical module to the exit point arranged on the optical module.

that the optical module is arranged with a movable hatch, wherein the movable hatch can be moved between covering the first entry point or covering the second entry point, that the optical module is arranged on a sight unit, wherein the sight unit is arranged on a weapon station or a launching device.

that the optical module is arranged with a control unit comprising at least one gyro.

The invention also comprises a method for converting an existing weapon station into a weapon station with an independent line of sight, wherein the conversion involves the arrangement of an optical module, with a variable line of sight, on a weapon station. The invention also comprises a sight unit arranged with an optical module, wherein the optical module contains at least a first mirror and at least a movably arranged second mirror.

The invention also comprises a weapon station embodied with a sight unit, wherein an optical module is arranged on the sight unit, and wherein the optical module contains at least a first mirror and at least a movably arranged second mirror.

BRIEF DESCRIPTION OF THE DRAWINGS

The invention is described in more detail below with reference to the accompanying figures, wherein.

DETAILED DESCRIPTION

Figure 1:
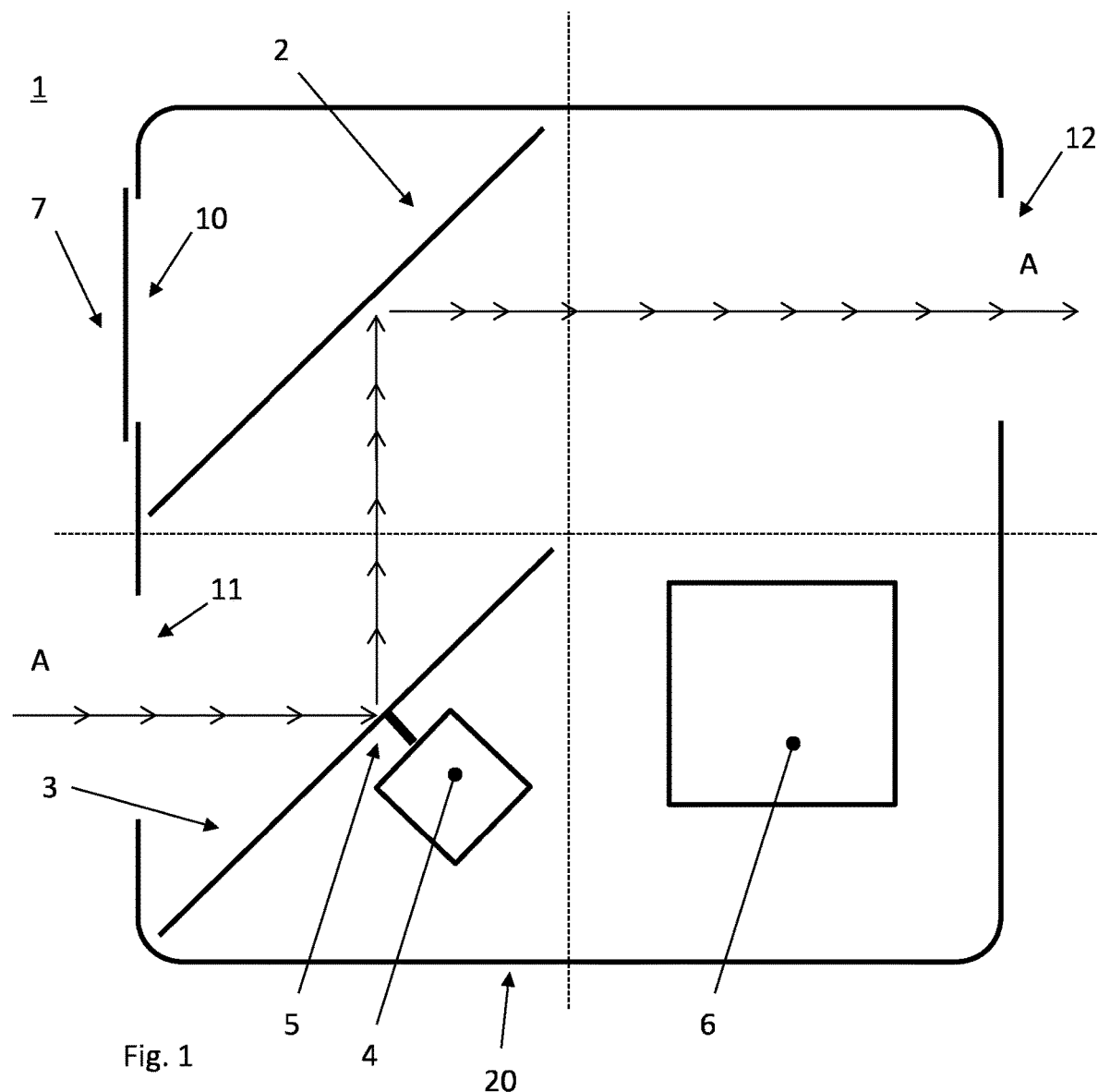
FIG. 1 depicts a view in cross-section from the side of an optical module when the line of sight is controlled by the optical module according to an embodiment of the invention.

Depicted in FIG. 1 is an optical module 1 for arrangement, for example, on a weapon station, a sight, an optical imager or some other optical sensor or sensor unit. The expression sight or sight unit is used to denote a device for the registration, observation and/or measuring of individuals, objects or a scenario or an environment. A first mirror 2 and a second mirror 3 are arranged in the optical module 1 for controlling the optical path A-A from an entry point to an exit point. The optical module 1 is arranged with three openings; a first entry point 10, a second entry point 11 and an exit point 12. A sliding or movable hatch 7 is arranged in order to block either the first entry point 10 or the second entry point 11. The second mirror 3 is arranged to be controlled by a servo unit 4 arranged with a link arm 5, wherein the link arm 5 is arranged in relation to the second mirror 3. The optical module 1 is also arranged with motor control and, where appropriate, with other control electronics, such as a gyro, by means of a control unit 6. The first mirror 2 is arranged in a folding manner, and the first mirror 2 is depicted in FIG. 1 arranged in the first position. The optical module 1 is arranged with a casing 20 which encloses the components in the optical module 1, wherein the casing 20 is arranged with a mounting device in order to arrange the casing 20 of the optical module 1 in relation to a weapon station, for example.

Figure 2:
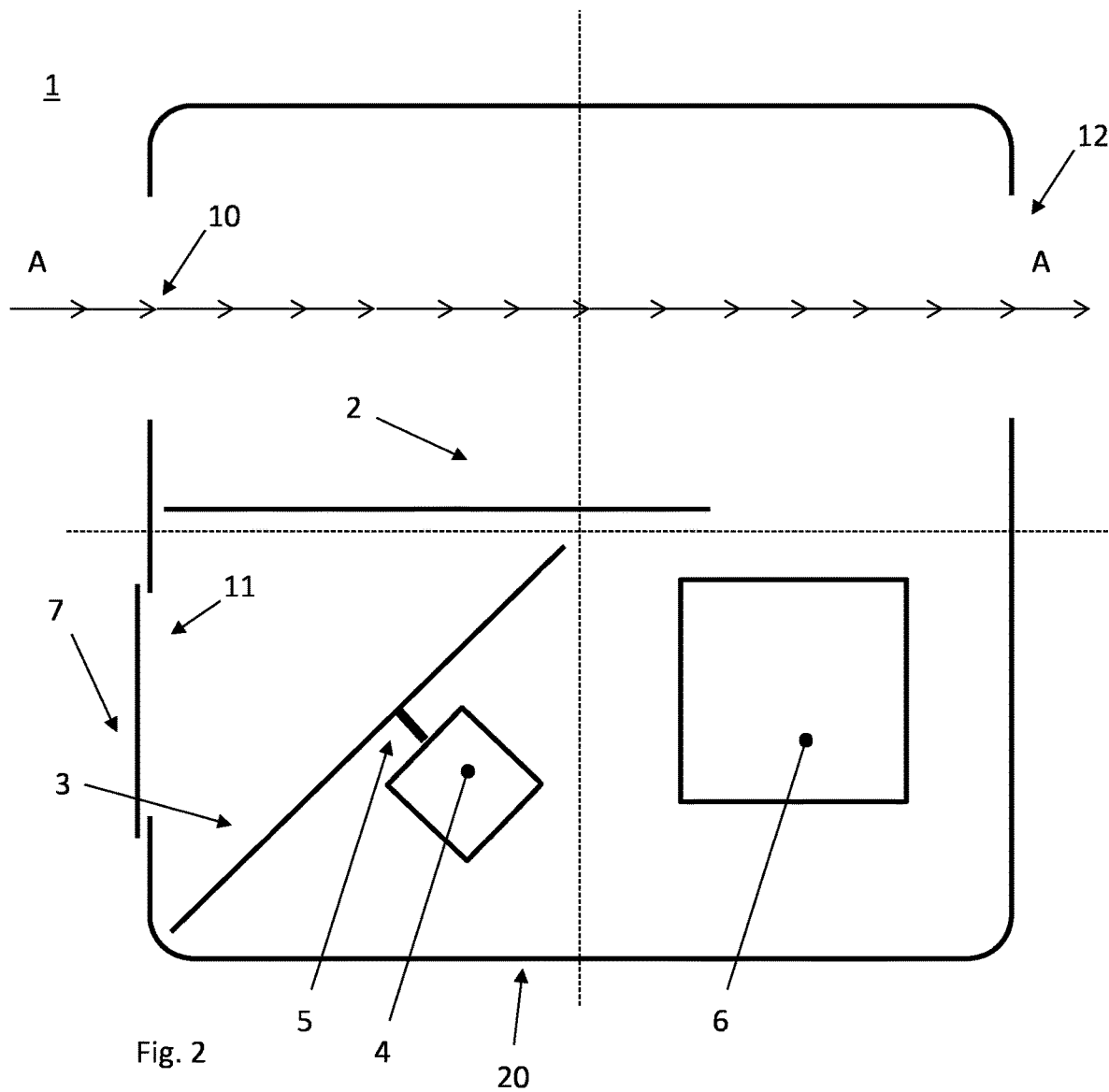
FIG. 2 depicts a view in cross-section from the side of an optical module when the line of sight is not controlled by the optical module according to an embodiment of the invention.

Depicted in FIG. 2 is the optical module 1 in cross-section from the side when the optical module 1 is arranged so that the optical path A-A passes through the optical module 1 without being influenced. The first mirror 2 is arranged in a folding manner, so that the first mirror 2 can be folded and thereby permit the optical path A-A to pass through the optical module 1 without being influenced, and the first mirror 2 is depicted in FIG. 2 arranged in the second position. The hatch 7 is moved compared with FIG. 1 so that the optical path A-A can pass through the first opening 10 and out through the exit point 12.

Figure 3:
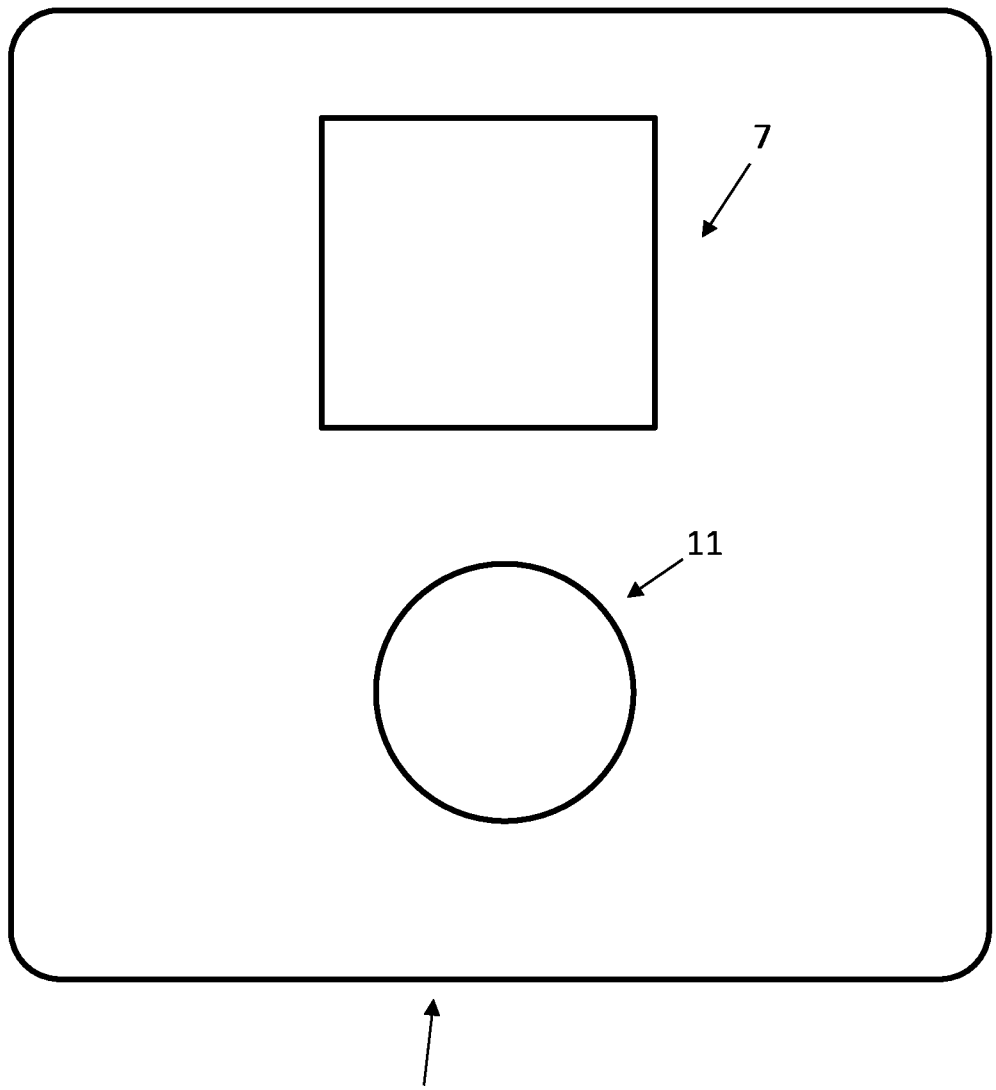
FIG. 3 depicts a view of an optical module from the front when the line of sight is controlled by the optical module according to an embodiment of the invention.

Depicted in FIG. 3 is the optical module 1 in a view from the front, and the hatch 7 is movably arranged so that the hatch 7 can cover the first opening 10 or the second opening 11. In FIG. 3, the hatch is arranged in front of the first opening 10 and the second opening 11 is uncovered thereby so that the optical path can pass through the optical module 1 through the second opening 11 to the exit point 12 via the first mirror 2 and the second mirror 3 arranged in the optical module 1.

Figure 4:
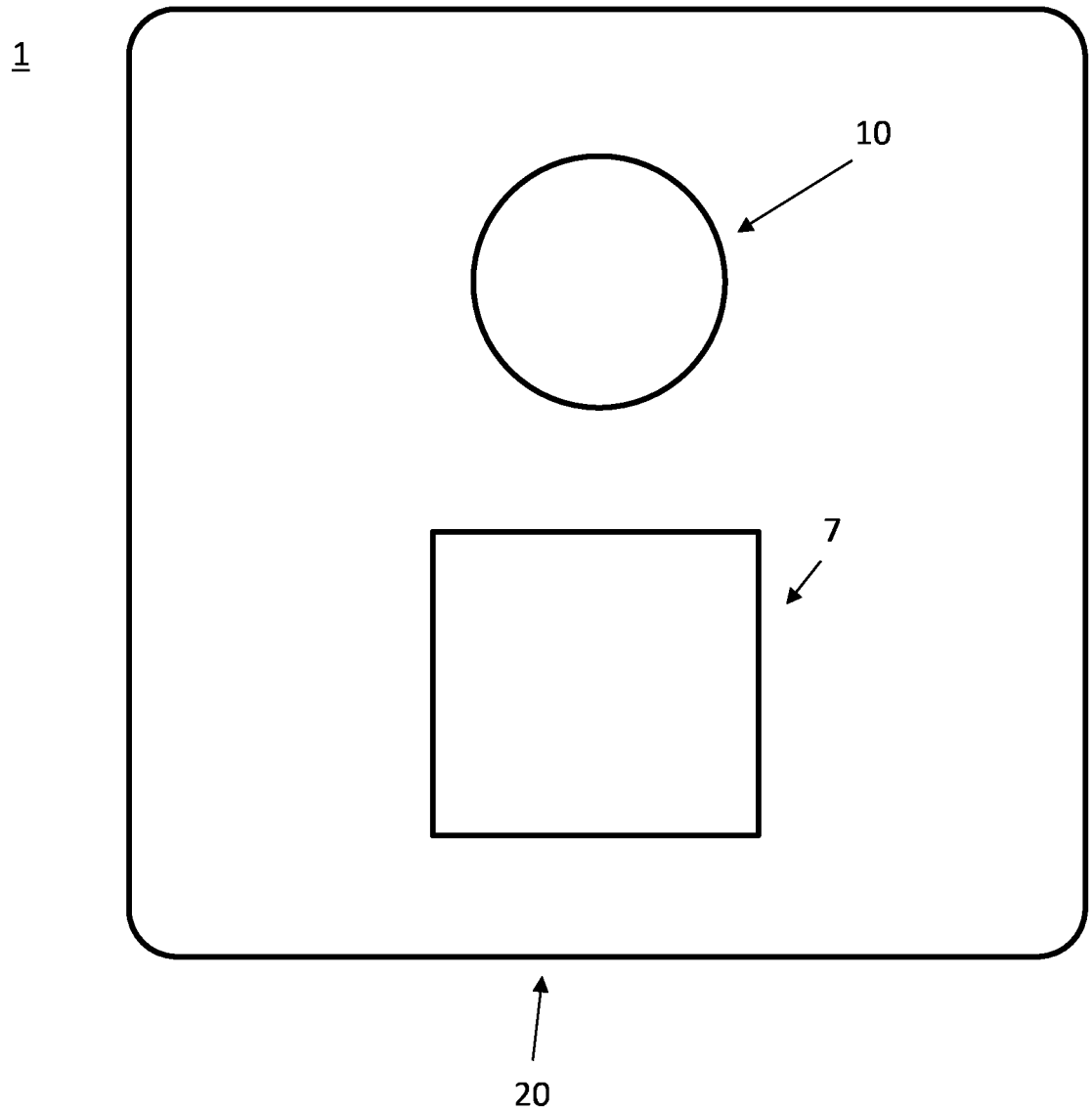
FIG. 4 depicts a view of an optical module from the front when the line of sight is not controlled by the optical module according to an embodiment of the invention.

Depicted in FIG. 4 is the optical module 1 in a view from the front, wherein the hatch 7 is arranged in front of the second opening 11 and the first opening 10 is uncovered thereby so that the optical path can pass through the optical module 1 through the first opening 10 to the exit point 12.

Figure 5:
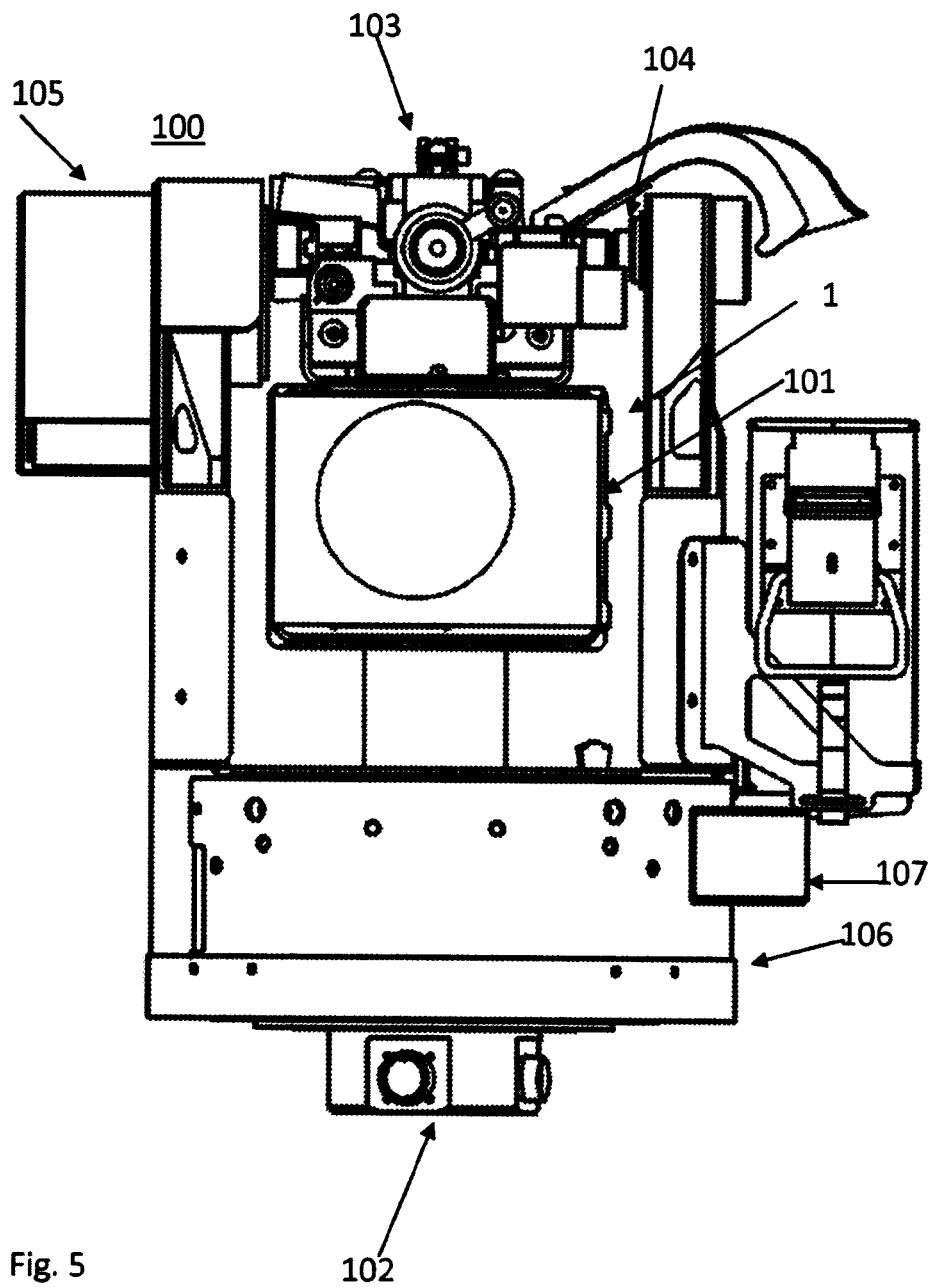
FIG. 5 depicts a view of an optical module arranged on a weapon station according to an embodiment of the invention.

Depicted in FIG. 5 is a weapon station 100 arranged with an optical module 1. The optical module 1 is arranged in front of the sensors of the sight unit 101. The weapon station 100 is mounted with a mounting device 102 on a carrier, for example a vehicle, although said carrier is not illustrated in the figure. The weapon station 100 is arranged with a weapon 103. The weapon 103 and the sight unit 101 are arranged on a horizontal shaft 104 which is controlled by a servo 105. The weapon station 100 is also rotatable in the vertical direction 106 by a servo 107.

In the case that the optical module 1 controls the optical path A-A, the optical path, which is depicted in FIG. 1, will pass through the second entry point 11, where it is reflected by the second mirror 3, and the optical path A-A will be directed, or reflected, by the second mirror 3 towards the first mirror 2, and the first mirror 2 will then further direct, or reflect, the optical path A-A out through the exit point 12. The second mirror 3 can be moved by a link arm 5, wherein the link arm is arranged in relation to a servo unit 4. The servo unit 4 can be a motor, a motor with a gearbox, or some other actuator, servo or device in order to move the link arm 5 and thereby also the second mirror 3. The servo unit 4 is controlled by a control unit 6 so that the link arm 5 influences the second mirror 3 so that the optical path A-A can be changed and adjusted. When the optical path A-A leaves the exit point 12, the optical path A-A will arrive at a sensor arranged on the weapon station, or some other device, on which the optical module 1 is arranged. In FIG. 1 the first mirror 2 is arranged in its first position, folded out of the way, in order to direct the optical path from the second mirror 3 towards the exit point 12. Directing of the second mirror 3 takes place with the help of the control unit 6. The control unit 6 can be controlled from an external control unit, wherein the external control unit is arranged, for example, on or adjacent to the weapon station. The control unit 6 can be connected, for example, with a galvanic electrical connection, an optical connection or a wireless connection to an external control unit. The external control unit controls the control unit 6 so that the optical path through the optical module 1 is directed in response to the command from the external control unit. The external control unit can be controlled, for example, from a control unit for the weapon station or the sight. In the case that an optical module 1 is arranged on a weapon station with a dependent line of sight, rite operator of the weapon station has the ability, by utilizing the optical module 1, to divert or in some other way redirect the line of sight so that the line of sight is controlled independently of the weapon station with a dependent line of sight, with the result that the weapon station is perceived as or behaves like a weapon station with an independent line of sight. An independent line of sight means that the line of sight is variable or is capable of being influenced or moved in some other way in relation to another line, such as a weapon line, that is to say the line with which the weapon is aimed. Some form of guidance system can also communicate with the control unit 6 so that, for example, a target is tracked automatically. The optical module 1 can also contain a gyro that is preferably arranged in relation to the control unit 6, or, alternatively, information from a gyro, gyro signals, can be generated from the sight unit on which the optical module 1 is arranged. Target data can be generated from the sight unit or the weapon station depending on the target data input by the sight unit. For the purpose of calculating the position of the target, information relating to how the second mirror 3 in the optical module 1 has been guided and information relating to the orientation of the sight unit is required. Target data can thereafter be used, for example, in order to engage the target. The optical module 1 also functions reciprocally, so that a laser rangefinder arranged in a sight unit, on which an optical module has been arranged, can illuminate an object with a laser, through the optical module 1, and can receive a reflected signal from the illuminated object, through the optical module 1 for the sight unit. The materials in the first mirror 2 and the second mirror 3 arranged in the optical module are selected so that the whole of the optical spectrum for the sensors arranged in the sight unit is reflected without influence.

In the case that the optical module 1 does not control the optical path, as illustrated in FIG. 2, the optical path A-A will pass through the optical module 1 without being influenced by the optical module 1. The first opening 10 and the exit point 12 are preferably not provided with any optics or other beam-influencing device. In the case that some form of lens, or other optics, is arranged in the first opening 10 and/or on the exit point 12, the lens is selected so that its influence on the optical path A-A is minimal or negligible. In the case that the optical path A-A is able to pass through the optical module 1 without influencing the optical path A-A, the weapon station, or the unit on which the optical module is arranged, will function in the same way as if no optical module were arranged on the weapon station. This adjustment possibility can be useful when the function of the optical module is not desired or in the case that the optical module 1 has ceased to function. The first mirror 2 is then arranged in its second position, in which it is folded down. When the first mirror 2 is arranged in its second position and when the hatch 7 is arranged in front of the second opening 11, the second mirror 3 will be arranged in a dust-free space inside the casing 20. In this position, the optical module 1 can be stored or arranged during transport or on some other occasion when the moving parts, the second mirror 3, the link arm 5 and the servo unit 4, are protected for example, from dust or other particles. Furthermore, the first mirror 2 and the hatch 7 can constitute electromagnetic screening for the second mirror 3, the link arm 5 and the servo unit 4 when the first mirror 2 is arranged in its second position and when the hatch 7 is arranged in front of the second opening 11.

In FIG. 3 the hatch is arranged in from of the first opening 10 and the second opening 11 is uncovered thereby so that the optical path tan pass through the optical module 1 through the second opening 11 to the exit point 12. The optical module thus controls the optical path and is able, by means of the mirror 3, to move the optical path.

In FIG. 4 the hatch is arranged in front of the second opening 11, and the first opening 10 is uncovered thereby. In this embodiment, furthermore, the first mirror 2 is folded down, arranged in its second position, in order thereby to permit an optical path from the first opening 10 to the exit point 12. In one embodiment, the hatch 7 can be arranged in relation to the first mirror 2, so that, when the hatch 7 is slid from the first opening 10 to the second opening 11, the first mirror 2 will be moved at the same time from its first position to its second position.

Depicted in FIG. 5 is a weapon station 100 arranged with a sight unit 101. The optical module 1 is arranged in front of the sensors of the sight unit 101. The weapon station 100 is mounted with a mounting device 102 on a carrier, for example a vehicle. It is relatively common for the weapon station 100 to be mounted with some form of screwed connection, for example on the roof of a combat vehicle or troop transport vehicle. The weapon station 100 is controlled from the vehicle, and sensor data from the weapon station are communicated to the vehicle. The weapon station 100 is arranged with a weapon 103. The weapon 103 can be controlled in both the horizontal and the vertical direction. The weapon 103 and the sight unit 101 are arranged on a horizontal shaft 104 which is controlled by a servo 105. The weapon station 100 is also capable of being rotated in the vertical direction 106 by a servo 107. In other alternative embodiments, the sight unit 101 can thus be arranged on its own vertical shaft and/or on its own horizontal shaft. The use of an optical module 1 is appropriate in the case that the sight unit 101 and the weapon 103 are arranged on the same vertical shaft, the same horizontal shaft or the same vertical and horizontal shaft. An optical module 1 can also be used in the case that the sight unit 101 and the weapon 103 are not arranged in relation to any common shaft, when the sight unit 101 is independent of the weapon 103. In the case that the sight unit 101 and the weapon 103 are independently arranged, however, an optical module 1 can solve problems relating to an accelerated procedure, reduced energy consumption, upgraded functionality, etc.

The hatch 7 can also be arranged to switch automatically, in response to an external command, between the first and second position in order thereby to be able to change so that the optical module 1 is able to vary between a dependent and an independent line of sight.

An example of an embodiment of the arrangement of an optical module on a weapon station is when the weapon station is configured with a dependent line of sight, and the arrangement of an optical module entails an independent line of sight. On a weapon station with a dependent line of sight, the sight unit is securely arranged in relation to the weapon unit, and when the weapon unit is moved, the sight unit is also moved.

The optical module can be configured with a mounting device for its attachment to the weapon station. An example of a mounting device can be a screwed connection or a clamped connection. The module can also be arranged with adhesive, magnets or other chemical, mechanical or other mounting methods. The optical module 1 can be developed tor a particular platform or product, in which case the casing 20 of the optical module is adapted so that the casing 20 is designed to fit the platform or product. The optical module 1 can also be embodied in the form of a generic module adapted to fit a large number of different platforms or products that are available on the market.

When an optical module 1 is arranged on a weapon station with a dependent line of sight, the weapon station will also appear with an independent line of sight. For example, a target, which is identified with the sight unit, can be registered and tracked at the same time as the weapon unit is aimed at a point where engagement of the target is appropriate, for example, in order to compensate for movement of the target. The weapon station, the operator of the weapon station or a fire control system calculates the position, the point of aim, where the weapon unit is aimed. The weapon station, the operator of the weapon station or a fire control system also tracks the target prior to engagement. At a certain time, which is considered to be appropriate by the weapon station, the operator of the weapon station or a fire control system, the weapon unit is fired and the target is engaged.

In an alternative embodiment, the optical module 1 can be utilized on other sights, optical imagers and/or other optical sensors in all frequency ranges. The optical module 1 can be utilized for a large number of different products or systems where an optical path can be adjusted simply in order to introduce a modifiable optical path for a fully or partially fixed system. Although this should be avoided, the optical module 1 is provided with lenses or windows on the first opening 10 and/or the second opening 11 and/or the exit point 12. For example, a lens or a window may be suitable in order to protect the optical module from external disturbances in the form of, for example, different forms of dust, electromagnetic radiation or other external disturbances. The lenses or windows that are used must be adapted to the one or more frequency ranges to which the sensors arranged after the optical module are adapted or within which they are active.

The invention claimed is:

1. An optical module for an independent line of sight, in relation to a second line, wherein the optical module is capable of being arranged on a sight unit, the optical module comprising at least a first mirror and at least a movably arranged second mirror, wherein it is possible to select, by moving the first mirror;
   i) wherein the optical module provides an independent line of sight, when the optical path passes via a second entry point arranged on the optical module, via at least the movably arranged second mirror and the first mirror, to an exit point arranged on the optical module, or
   ii) wherein the optical module does not influence the optical path through the optical module, when the optical path passes freely through the optical module through a first entry point arranged on the optical module to the exit point arranged on the optical module, wherein the movably arranged second mirror is controlled from an externally arranged control unit.

2. The optical module according to claim 1, wherein the optical module is arranged with a movable hatch, wherein the movable hatch can be moved between covering the first entry point or covering the second entry point.

3. An optical module for an independent line of sight, in relation to a second line, wherein the optical module is capable of being arranged on a sight unit, the optical module comprising at least a first mirror and at least a movably arranged second mirror, wherein it is possible to select, by moving the first mirror;
   i) wherein the optical module provides an independent line of sight, when the optical path passes via a second entry point arranged on the optical module, via at least the movably arranged second mirror and the first mirror, to an exit point arranged on the optical module, or
   ii) wherein the optical module does not influence the optical path through the optical module, when the optical path passes freely through the optical module through a first entry point arranged on the optical module to the exit point arranged on the optical module, wherein the optical module is arranged with a control unit comprising at least one gyro.

4. The optical module according to claim 3, wherein the movably arranged second mirror is controlled from an externally arranged control unit.

5. A device for a sight, comprising the optical module according to claim 1 arranged on a sight unit for arrangement on a weapon station or a launching device.

6. The device according to claim 5, wherein the sight unit contains electro-optical sensors.

7. Device according to claim 6, wherein the electro-optical sensors are at least one of the following: a video sensor adapted for the visible optical wavelength range, an IR sensor or a laser rangefinder.

8. A weapon station embodied with the device according to claim 5.

9. A method for converting an existing weapon station into a weapon station with an independent line of sight, wherein the conversion involves the arrangement of the optical module with a variable line of sight according to claim 1, on a weapon station.

* * * * *